(12) United States Patent
Gu et al.

(10) Patent No.: US 11,348,455 B2
(45) Date of Patent: May 31, 2022

(54) INTERSECTION TRAFFIC CONTROL METHOD, APPARATUS AND SYSTEM

(71) Applicant: Guangzhou Automobile Group Co., Ltd., Guangdong (CN)

(72) Inventors: Jun Gu, Guangdong (CN); Qinggui Pan, Guangdong (CN); Qiaojun He, Guangdong (CN); Lulong Cai, Guangdong (CN); Ming Fan, Guangdong (CN); Qian Mao, Guangdong (CN); Yanlin Li, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 93 days.

(21) Appl. No.: 16/327,337

(22) PCT Filed: Aug. 31, 2018

(86) PCT No.: PCT/CN2018/103624
§ 371 (c)(1),
(2) Date: Feb. 22, 2019

(87) PCT Pub. No.: WO2019/109685
PCT Pub. Date: Jun. 13, 2019

(65) Prior Publication Data
US 2021/0390851 A1 Dec. 16, 2021

(30) Foreign Application Priority Data

Dec. 8, 2017 (CN) .......................... 201711297577.3

(51) Int. Cl.
| | | |
|---|---|---|
| *G08G 1/052* | (2006.01) | |
| *H04W 4/46* | (2018.01) | |
| *G06N 20/00* | (2019.01) | |
| *G08G 1/0967* | (2006.01) | |

(Continued)

(52) U.S. Cl.
CPC ............. *G08G 1/052* (2013.01); *G06N 20/00* (2019.01); *G08G 1/096725* (2013.01);
(Continued)

(58) Field of Classification Search
CPC .. G08G 1/052; G08G 1/096725; G08G 1/161; G08G 1/166; H04W 4/46;
(Continued)

(56) References Cited

U.S. PATENT DOCUMENTS

| | | | |
|---|---|---|---|
| 2016/0063858 A1 | 3/2016 | Schmudderich et al. | |
| 2018/0122234 A1* | 5/2018 | Nascimento | G08G 1/093 |
| 2020/0346666 A1* | 11/2020 | Wray | G05D 1/0088 |

FOREIGN PATENT DOCUMENTS

| | | |
|---|---|---|
| CN | 1441369 A | 9/2003 |
| CN | 104635736 A | 5/2015 |

(Continued)

*Primary Examiner* — Tyler J Lee
*Assistant Examiner* — Yufeng Zhang
(74) *Attorney, Agent, or Firm* — ScienBiziP, P.C.

(57) ABSTRACT

An intersection traffic control method, apparatus and system are provided. The method includes that: a vehicle signal of a first vehicle at an intersection and a vehicle signal of a second vehicle located in a set zone in proximity to the intersection are acquired; the vehicle signal of the first vehicle and the vehicle signal of the second vehicle are input into an instruction learning model trained in advance based on a reinforcement learning principle, and a score of a preset traffic indicator of the first vehicle after executing a respective candidate action instruction is calculated; a reward of the first vehicle when executing the respective candidate action instruction is acquired according to the score of the preset traffic indicator, a candidate action instruction corresponding to a maximum reward is determined as an output result of the instruction learning model, and a next action instruction is determined according to the output result; and (Continued)

navigation of the first vehicle through the intersection is controlled according to the next action instruction.

20 Claims, 4 Drawing Sheets

(51) Int. Cl.
    *G08G 1/16*         (2006.01)
    *H04L 12/40*      (2006.01)

(52) U.S. Cl.
    CPC .............. *G08G 1/161* (2013.01); *G08G 1/166* (2013.01); *H04L 12/40* (2013.01); *H04W 4/46* (2018.02); *H04L 2012/40215* (2013.01); *H04L 2012/40273* (2013.01)

(58) Field of Classification Search
    CPC .................... G06N 20/00; H04L 12/40; H04L 2012/40215; H04L 2012/40273
    See application file for complete search history.

(56) References Cited

FOREIGN PATENT DOCUMENTS

| | | |
|---|---|---|
| CN | 104851280 A | 8/2015 |
| CN | 105702036 A | 6/2016 |
| CN | 105774803 A | 7/2016 |
| CN | 106080590 A | 11/2016 |
| CN | 106251583 A | 12/2016 |
| CN | 106355918 A | 1/2017 |
| CN | 106504548 A | 3/2017 |
| CN | 107085953 A | 8/2017 |
| CN | 107168303 A | 9/2017 |
| CN | 107169567 A | 9/2017 |
| CN | 107182206 A | 9/2017 |
| CN | 107229973 A | 10/2017 |
| JP | 2011018165 A | 1/2011 |

\* cited by examiner

INTERSECTION TRAFFIC CONTROL METHOD, APPARATUS AND SYSTEM

TECHNICAL FIELD

The present disclosure relates to the technical field of vehicle control, and more particularly to an intersection traffic control method, apparatus and system, a computer-readable storage medium, and a computer device.

BACKGROUND

A self-driving vehicle is a kind of smart vehicle. This kind of vehicle mainly relies on a computer-based smart pilot in the vehicle to achieve the goal of unmanned driving.

At present, due to complicated road conditions and varying traffic conditions, when passing through an intersection, a self-driving vehicle generally relies on a traffic light system which dispatches the traffic at the intersection. However, when passing through an intersection without traffic lights, in order to ensure safety, a self-driving vehicle generally adopts conservative strategies to pass through the intersection at a lower speed, so the traffic efficiency is lower.

SUMMARY

In view of this problem, an intersection traffic control method, apparatus and system, a computer-readable storage medium, and a computer device are provided to solve the problem in the related art that the traffic efficiency is low when a self-driving vehicle passes through an intersection.

The solution provided by the embodiments of the present disclosure is described as follows.

An intersection traffic control method may include the operations as follows.

A vehicle signal of a first vehicle at an intersection and a vehicle signal of a second vehicle located in a set zone in proximity to the intersection are acquired.

The vehicle signal of the first vehicle and the vehicle signal of the second vehicle are input into an instruction learning model trained in advance based on a reinforcement learning principle, an output result of the instruction learning model is acquired, and a next action instruction of the first vehicle is determined according to the output result.

Navigation of the first vehicle through the intersection is controlled according to the next action instruction.

In the method, the instruction learning model calculates, according to the input vehicle signal of the first vehicle and the input vehicle signal of the second vehicle, a score of a preset traffic indicator of the first vehicle after executing a respective candidate action instruction, acquires, according to the score of the preset traffic indicator, a reward of the first vehicle when executing the respective candidate action instruction, and determines a candidate action instruction corresponding to a maximum reward as the output result.

In one of the embodiments, the preset traffic indicator may include one or more of a first traffic indicator acquired based on a speed, a second traffic indicator acquired based on a danger zone, and a third traffic indicator acquired based on an acceleration and a steering angle.

A score of the first traffic indicator may be calculated by means of the following manner: determining the score of the first traffic indicator under the respective candidate action instruction according to an average speed of the first vehicle from entering the intersection to executing the respective candidate action instruction, the first traffic indicator being used to represent efficiency of the first vehicle passing through the intersection.

A score of the second traffic indicator may be calculated by means of the following manner: determining the score of the second traffic indicator under the respective candidate action instruction according to an area of the danger zone between the first vehicle, when executing the respective candidate action instruction, and the second vehicle, the second traffic indicator being used to represent safety of the first vehicle passing through the intersection, and the danger zone being an overlapping zone of an elliptical zone where the first vehicle is located and an elliptical zone where the second vehicle is located.

A score of the third traffic indicator may be calculated by means of the following manner: determining the score of the third traffic indicator under the respective candidate action instruction according to an acceleration and a steering wheel angle of the first vehicle and a time span taken by the first vehicle to pass through the intersection when the first vehicle executes the respective candidate action instruction, the third traffic indicator being used to represent stationarity of the first vehicle passing through the intersection.

The reward may be calculated by means of the following manner: performing weighted summation on the score of the first traffic indicator, the score of the second traffic indicator and the score of the third traffic indicator to acquire the reward of the first vehicle when executing the respective candidate action instruction.

In the embodiments, the vehicle signal may include one or more of position information, speed information, acceleration information and steering wheel angle information of a vehicle.

In one of the embodiments, the score of the second traffic indicator may be acquired by the following formula:

$$f(D) = 0.25 \times [\theta_1 \times (r_1)^2 + \theta_2 \times (r_2)^2 - (h_1 + h_2) \times d_{12}],$$

where $d_{12}$ is a distance between a geometric center of the first vehicle and a geometric center of the second vehicle, $r_1$ and $r_2$ are a dynamic radius of the first vehicle in polar coordinates and a dynamic radius of the second vehicle in polar coordinates, respectively, $\theta_1$ and $\theta_2$ are an angle formed between the geometric center of the first vehicle and overlapping intersections of the overlapping zone in the polar coordinates and an angle formed between the geometric center of the second vehicle and the overlapping intersections of the overlapping zone in the polar coordinates, respectively, and $h_1$ and $h_2$ are vertical distances from the overlapping intersections of the overlapping zone to $d_{12}$, respectively.

In one of the embodiments, the score of the third traffic indicator may be acquired by the following formula:

$$f(\alpha, \theta) = C_1 \times \sqrt{\frac{1}{n}\sum_{i=1}^{n}\left(\frac{d\alpha}{dt}\right)^2} + C_2 \times \sqrt{\frac{1}{n}\sum_{i=1}^{n}\left(\frac{d\theta}{dt}\right)^2},$$

where $C_1$ and $C_2$ are preset weight factors, n is the time span taken by the first vehicle to pass through the intersection, $\alpha$ is the acceleration of the first vehicle when executing the respective candidate action instruction, and $\theta$ is the steering wheel angle of the first vehicle when executing the respective candidate action instruction.

In one of the embodiments, the reward of the first vehicle when executing the respective candidate action instruction may be acquired by the following formula:

$$Reward = k_1 \times f(v) - k_2 \times f(D) - k_3 \times f(\alpha, \theta),$$

where Reward represents the reward, f(v) is the first traffic indicator, f(D) is the second traffic indicator, f(α, θ) is the third traffic indicator, and $k_1$, $k_2$ and $k_3$ are preset weight factors.

In one of the embodiments, the intersection traffic control method may further include the operations as follows.

Whether the first vehicle leaves the intersection is judged, and if not, the vehicle signal of the first vehicle and the vehicle signal of the second vehicle are periodically acquired according to a preset frequency and the navigation of the first vehicle is controlled based on the instruction learning model until the first vehicle passes through the intersection.

In one of the embodiments, the intersection may include any one of a roundabout intersection, a crossroad without a traffic light, and a T-shaped intersection without a traffic light.

In one of the embodiments, the first vehicle may acquire the vehicle signal of the second vehicle located in the set zone in proximity to the intersection through Vehicle-to-Vehicle (V2V) communication.

In one of the embodiments, the instruction learning model may be acquired by means of the following manner:

constructing a simulated intersection environment similar to an intersection environment;

acquiring multiple sets of preset sample data, each set of preset sample data including a vehicle signal of a first vehicle and a vehicle signal of a second vehicle in the simulated intersection environment, and further including information of an optimal actual next action instruction enabling the first vehicle to normally pass through the intersection; and inputting the sample data to the instruction learning model in the simulated intersection environment to calculate an indicator value and a reward to acquire a candidate action instruction, and modifying model parameter values of the instruction learning model according to a matching situation of the calculated candidate action instruction and the optimal actual next action instruction until a matching degree between the next action instruction of the first vehicle predicted by the instruction learning model and the optimal actual next action instruction of the first vehicle reaches a set matching threshold.

An intersection traffic control apparatus may include:

a signal acquisition module, configured to acquire a vehicle signal of a first vehicle at an intersection and a vehicle signal of a second vehicle located in a set zone in proximity to the intersection;

an instruction determination module, configured to input the vehicle signal of the first vehicle and the vehicle signal of the second vehicle into an instruction learning model trained in advance based on a reinforcement learning principle, acquire an output result of the instruction learning model, and determine a next action instruction of the first vehicle according to the output result; and an execution module, configured to control navigation of the first vehicle through the intersection according to the next action instruction.

The instruction learning model calculates, according to the input vehicle signal of the first vehicle and the input vehicle signal of the second vehicle, a score of a preset traffic indicator of the first vehicle after executing a respective candidate action instruction, acquires, according to the score of the preset traffic indicator, a reward of the first vehicle when executing the respective candidate action instruction, and determines a candidate action instruction corresponding to a maximum reward as the output result.

An intersection traffic control system may include: a sensor module, a processor module and an executor module.

The sensor module may include a sensor, a Controller Area Network (CAN) receiver and a Vehicle-to-Vehicle Communication (V2V) signal transceiver, wherein the sensor is configured to acquire vehicle information of a first vehicle at an intersection, the V2V signal transceiver is configured to acquire a vehicle signal of a second vehicle located in a set zone in proximity to the intersection, and the CAN receiver is configured to collect the vehicle signal of the first vehicle acquired by the sensor and the vehicle signal of the second vehicle acquired by the V2V signal transceiver, and send the vehicle signal of the first vehicle and the vehicle signal of the second vehicle to the processor module. There may be more than one or two second vehicles.

The processor module may be configured to input the vehicle signal of the first vehicle and the vehicle signal of the second vehicle into an instruction learning model trained in advance based on a reinforcement learning principle, acquire an output result of the instruction learning model, determine a next action instruction according to the output result, and output the next action instruction to the executor module.

The executor module may be configured to control navigation of the first vehicle through the intersection according to the next action instruction.

A computer-readable storage medium may have a computer program stored thereon, wherein the program is executed by a processor to implement the operations in the above intersection traffic control method.

A computer device may include a memory, a processor and a computer program that is stored on the memory and runnable on the processor, wherein the program is executed by the processor to implement the operations in the above intersection traffic control method.

The implementation of the above embodiments has the following beneficial effects: a vehicle signal of a first vehicle at an intersection and a vehicle signal of at least one second vehicle located in a set zone in proximity to the intersection are acquired; the vehicle signal of the first vehicle and the vehicle signal of the at least one second vehicle are input into an instruction learning model trained in advance based on a reinforcement learning principle, an output result of the instruction learning model is acquired, and a next action instruction is determined according to the output result; and navigation of the first vehicle through the intersection is controlled according to the next action instruction. When passing through the intersection, a next action instruction of the first vehicle that can ensure safety in a current environment is acquired in real time through a pre-trained instruction learning model. Under the premise of ensuring the traffic safety of the intersection, the defect of low intersection traffic efficiency caused by passage of the intersection at a low speed is overcome and the traffic efficiency of the intersection is improved.

DETAILED DESCRIPTION OF THE EMBODIMENTS

Figure 1:
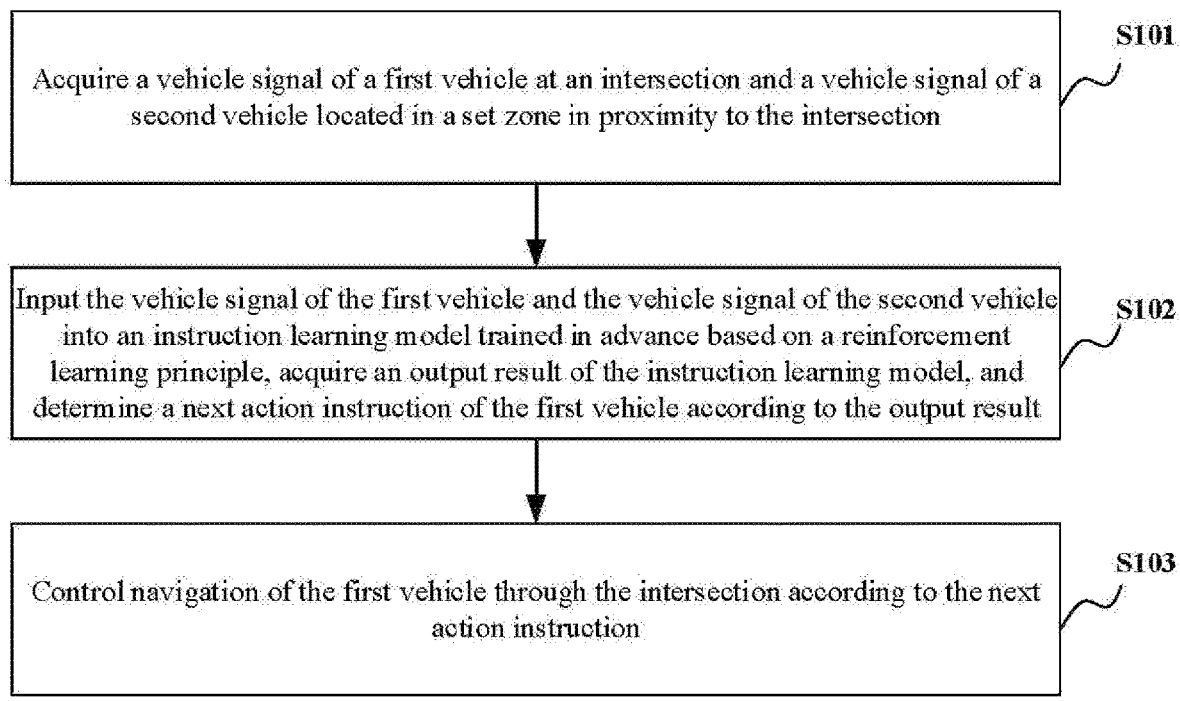
FIG. 1 is a schematic flowchart of an intersection traffic control method according to an embodiment.

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

The terms "include" and "have" and any variations thereof in the embodiments of the present disclosure are intended to cover non-exclusive inclusions. For example, a process, method, system, product, or device that includes a series of operations or (module) units is not limited to the listed operations or units, but optionally includes operations or units not listed, or also optionally includes other operations or units inherent to these processes, methods, products or devices.

"Multiple" as referred to herein means two or more. The term "and/or" is an association describing associated objects, indicating that there may be three relationships. For example, A and/or B may indicate that A exists separately, both A and B exist simultaneously, and B exists separately. The character "/" generally indicates that the contextual object is an "or" relationship.

References to "embodiment" herein mean that a particular feature, structure, or characteristic described in connection with the embodiments can be included in at least one embodiment of the present application. The appearances of the phrases in various places in the specification are not necessarily referring to the same embodiments, and are not independent or alternative embodiments that are mutually exclusive to other embodiments. Those skilled in the art will explicitly and implicitly understand that the embodiments described herein can be combined with other embodiments.

The operations in the embodiments of the present disclosure are arranged by reference numerals, but are not intended to limit the order of operations. The relative order of the operations may be adjusted unless the order of the operations is explicitly stated or the execution of an operation requires other operations as a basis.

The embodiments of the present disclosure can be applied to a self-driving control system of a self-driving vehicle, and a first vehicle referred to in the following embodiments specifically refers to the self-driving vehicle. Of course, the embodiments of the present disclosure may also be applied to other vehicles having a self-driving mode.

FIG. 1 is a schematic flowchart of an intersection traffic control method according to an embodiment. As shown in FIG. 1, the intersection traffic control method in the present embodiment includes the operations S101 to S103 as follows.

In operation S101, a vehicle signal of a first vehicle at an intersection and a vehicle signal of a second vehicle located in a set zone in proximity to the intersection are acquired.

In the present operation, the intersection may refer to an intersection without a traffic light such as a roundabout intersection, a crossroad without a traffic light, and a T-shaped intersection without a traffic light. The vehicle signal refers to information such as a vehicle speed, a vehicle position, and a driving direction.

In the exemplary embodiment, a vehicle signal of a first vehicle at an intersection may be calculated by a sensor, and a vehicle signal of a second vehicle located in a set zone in proximity to the intersection may be acquired by a wireless network communication technology or a communication device. A next action instruction of the first vehicle is determined according to the vehicle signal of the first vehicle and the vehicle signal of the second vehicle, thereby ensuring the safety of driving and improving the traffic efficiency of the intersection.

In an exemplary embodiment, the vehicle signal includes one or more of position information, speed information, acceleration information and steering wheel angle information of a vehicle. The position information refers to GPS latitude and longitude coordinates of a vehicle.

In operation S102, the vehicle signal of the first vehicle and the vehicle signal of the second vehicle are input into an instruction learning model trained in advance based on a reinforcement learning principle, an output result of the instruction learning model is acquired, and a next action instruction of the first vehicle is determined according to the output result.

In the present operation, the action instruction is used to control the time and/or direction of the first vehicle passing through the intersection. The instruction learning model is acquired by multiple trainings based on specific road conditions and vehicle information as well as the principle of reinforcement learning. An optimal action instruction in a current environment can be selected from all the candidate action instructions according to the input vehicle signal of the first vehicle and the input vehicle signal of the second vehicle, thereby acquiring an optimal next action instruction of the first vehicle in the current environment.

In the exemplary embodiment, the vehicle signal of the first vehicle and the vehicle signal of the second vehicle are input into an instruction learning model trained in advance based on a reinforcement learning principle, the instruction learning model can calculate, according to the input vehicle signal of the first vehicle and the input vehicle signal of the second vehicle, a score of a preset traffic indicator of the first vehicle after executing a respective candidate action instruction; a reward of the first vehicle when executing the respective candidate action instruction is acquired according to the score of the preset traffic indicator, a candidate action instruction corresponding to a maximum reward is determined as an output result, and a next action instruction is determined according to the output result. The candidate action instruction corresponding to a maximum reward is the optimal next action instruction in the current environment. Multiple traffic indicators of the first vehicle after executing a respective candidate action instruction are calculated based on the vehicle signal of the first vehicle and the vehicle signal of the second vehicle. The optimal next action instruction of the first vehicle is determined according to the multiple traffic indicators. The optimal next action instruction can be accurately determined, the traffic safety is ensured, and the timeliness is high, which can effectively improve the traffic efficiency of vehicles at intersections.

In operation S103, navigation of the first vehicle through the intersection is controlled according to the next action instruction.

According to the above embodiments, a vehicle signal of a first vehicle at an intersection and a vehicle signal of a second vehicle located in a set zone in proximity to the intersection are acquired; the vehicle signal of the first vehicle and the vehicle signal of the second vehicle are input into an instruction learning model trained in advance based on a reinforcement learning principle, an output result of the instruction learning model is acquired, and a next action instruction is determined according to the output result; and navigation of the first vehicle through the intersection is controlled according to the next action instruction. When passing through the intersection, an optimal next action instruction of the first vehicle that can ensure safety is acquired, the defect of low intersection traffic efficiency caused by passage of the intersection at a low speed is overcome, and the traffic efficiency of the intersection is improved.

In an exemplary embodiment, the candidate action instruction includes any one of a first dimension action instruction, a second dimension action instruction, and a combined action instruction of the first dimension action instruction and the second dimension action. For example, the first dimension action instruction may be an acceleration action instruction, and the second dimension action instruction may be a steering wheel action instruction. In the exemplary embodiment, the candidate action instruction is, for example, leftward acceleration, leftward constant-speed action, leftward deceleration, maintained acceleration, maintained constant-speed action, maintained deceleration, rightward acceleration, rightward constant-speed action, and rightward deceleration.

Figure 2:
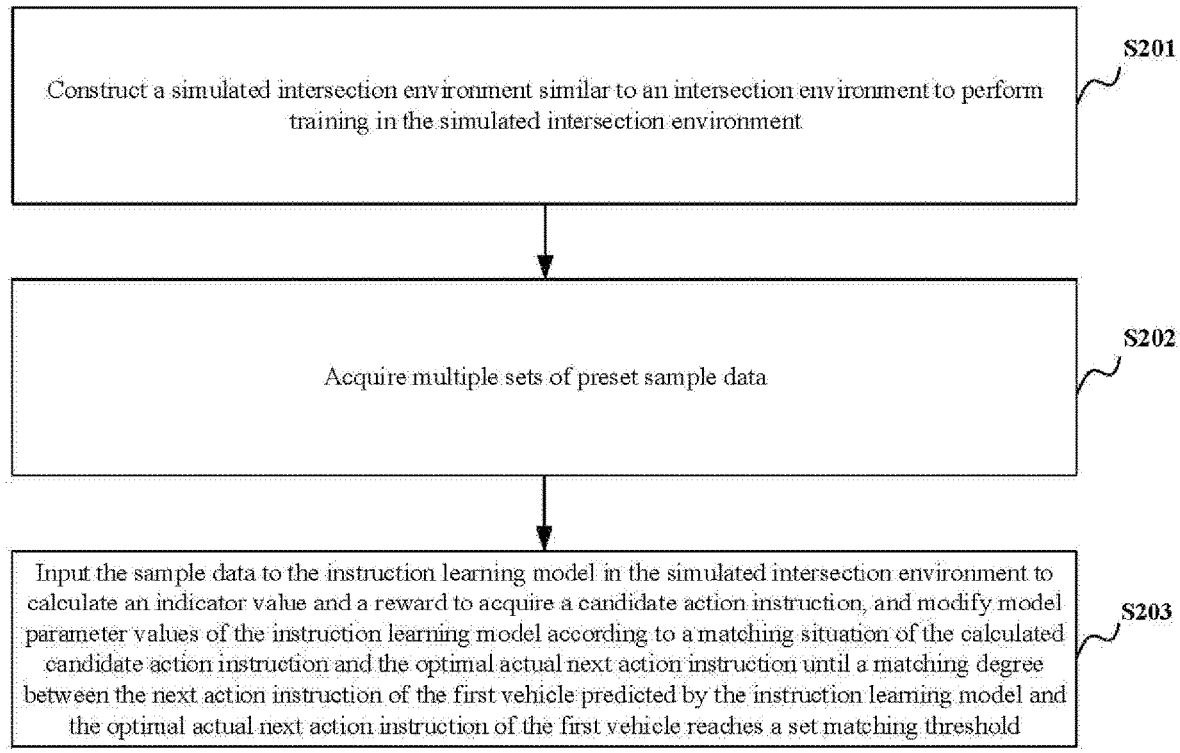
FIG. 2 is a schematic flowchart of a training process of an instruction learning model according to an embodiment.

FIG. 2 is a schematic flowchart of a training process of an instruction learning model according to an embodiment. In an exemplary embodiment, as shown in FIG. 2, the instruction learning model is acquired by means of the following manner.

In operation S201, a simulated intersection environment similar to an intersection environment is constructed to perform training in the simulated intersection environment.

In the present operation, the simulated intersection environment refers to an intersection environment highly similar to a real intersection, which may be constructed on a terminal device such as a computer device. In the simulated intersection environment, a great number of samples can be learned and trained.

In operation S202, multiple sets of preset sample data are acquired.

In the present operation, each set of preset sample data includes a vehicle signal of a first vehicle and a vehicle signal of a second vehicle in the simulated intersection environment, and further includes information of an optimal actual next action instruction enabling the first vehicle to normally pass through the intersection, namely, an action instruction acquired by historical data of the intersection and executed by the first vehicle in a real intersection environment. The optimal actual next action instruction information of the first vehicle is acquired and compared with the next action instruction predicted by the instruction learning model in the simulated intersection environment in the subsequent operation. According to the comparison of the predicted action instruction and the actual next action instruction information, the prediction accuracy of the instruction learning model can be verified.

In operation S203, the sample data is input to the instruction learning model in the simulated intersection environment to calculate an indicator value and a reward to acquire a candidate action instruction, and model parameter values of the instruction learning model are modified according to a matching situation of the calculated candidate action instruction and the optimal actual next action instruction until a matching degree between the next action instruction of the first vehicle predicted by the instruction learning model and the optimal actual next action instruction of the first vehicle reaches a set matching threshold.

In the above operations, the preset instruction learning model includes multiple parameters, during initiation, the values of various parameters are randomly set according to constraint conditions, the values of the parameters are repeatedly adjusted by the sample training to adjust the output result of the model, the parameter values in the model are adjusted according to a matching situation of a next action instruction of the first vehicle repeatedly predicted by the instruction learning model and an actual next action instruction of the first vehicle until a matching degree between the next action instruction predicted repeatedly and the actual next action instruction of the first vehicle reaches a setting requirement (or a successive set number of predicted next action instructions are consistent with an actual next action instruction), and a current parameter value of each parameter in the instruction learning model is acquired as an optimal parameter value related to an intersection environment, thereby acquiring a trained instruction learning model.

In the exemplary embodiment, the sample data is input to the instruction learning model in the simulated intersection environment to calculate an indicator value and a reward to acquire a candidate action instruction, and preset parameter values of the instruction learning model are modified according to a matching result of a candidate action instruction of the first vehicle predicted by the instruction learning model and an actual next action instruction of the first vehicle until the matching degree reaches a preset matching threshold such as 95%. Thus, by modifying the parameter values, the accuracy of the next motion instruction of the first vehicle predicted by the instruction learning model can be improved.

In an exemplary embodiment, after the training in the simulated intersection environment is over, the instruction learning model can be further trained through a real intersection environment. That is, the process of training the instruction learning model also includes the operation of constructing a real intersection environment and performing model training in the real intersection environment. The specific implementation manner of the operation may be: deploying the instruction learning model trained by the above simulated intersection environment into a real vehicle, to further optimize and debug the instruction learning model in the real intersection environment to further improve the determination accuracy of the next action instruction by training the instruction learning model.

In the above embodiment, the model training includes virtual training and real scene training, and a training ratio of the simulated intersection environment and the real intersection environment may be set. For example, the training amount ratio reference value of the two may be 10:1. The virtual scene training refers to: in the early stage, constructing a simulated environment that is highly consistent with the real intersection environment on a PC side, and learning and training a large number of samples in this environment. The real scene training refers to: deploying the instruction learning model that has been trained through the virtual scene to the real vehicle for model training optimization and system debugging in the real scene. The simulated intersection environment training and the real intersection environment training are integrated to ensure that the instruction learning model effectively determines an optimal next action instruction.

Figure 3:
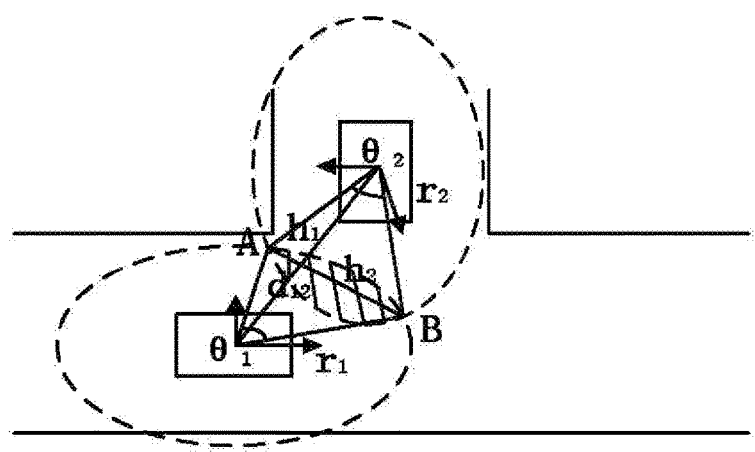
FIG. 3 is a schematic diagram of a danger zone between a first vehicle and a second vehicle in polar coordinates according to an embodiment.

In an exemplary embodiment, the preset traffic indicator includes one or more of a first traffic indicator acquired based on a speed, a second traffic indicator acquired based on a danger zone, and a third traffic indicator acquired based on an acceleration and a steering angle. A score of the first traffic indicator is acquired by means of the following manner: determining the score of the first traffic indicator according to an average speed of the first vehicle from entering the intersection to reaching a current position, the first traffic indicator being used to represent efficiency of the first vehicle passing through the intersection, namely a traffic efficiency indicator. A score of the second traffic indicator may be acquired by means of the following manner: determining the score of the second traffic indicator according to an area of the danger zone between the first vehicle and the second vehicle, the second traffic indicator being used to represent safety of the first vehicle passing through the intersection, namely, a traffic safety indicator, and the danger zone being an overlapping zone of an elliptical zone where the first vehicle is located and an elliptical zone where the second vehicle is located, as shown in FIG. 3. A score of the third traffic indicator is acquired by means of the following manner: determining the score of the third traffic indicator according to an acceleration of the first vehicle, a steering wheel angle, and the time span taken by the first vehicle to pass through the intersection, the third traffic indicator being used to represent stationarity of the first vehicle passing through the intersection, namely, a traffic comfort indicator.

In the above embodiment, the score of the first traffic indicator, the score of the second traffic indicator and the score of the third traffic indicator are comprehensively considered according to the input vehicle signal of the first vehicle and the input vehicle signal of the second vehicle, thereby ensuring that the traffic speed and comfort of a vehicle at an intersection are effectively improved under the premise of ensuring safety.

In an exemplary embodiment, the reward is acquired by means of the following manner: performing weighted summation on the score of the first traffic indicator, the score of the second traffic indicator and the score of the third traffic indicator to acquire the reward of the first vehicle when executing the respective candidate action instruction. In the above embodiment, the reward of the first vehicle when executing the respective candidate action instruction is calculated to determine an optimal next action instruction of the first vehicle from each candidate action instruction according to the magnitude of each reward.

In an embodiment, the score of the first traffic indicator is acquired by the following formula:

$$f(v) = \frac{\sum_{k=0}^{k} v_k}{k+1},$$

where $v_k$ is the speed of the first vehicle collected at the kth time after the first vehicle enters the intersection, and k+1 is the number of speed samples of the first vehicle from entering the intersection to executing the respective candidate action instruction. In the above embodiment, the efficiency of the first vehicle passing through the intersection is measured according to an average speed of the first vehicle from entering the intersection to executing the respective candidate action instruction.

In an exemplary embodiment, as shown in FIG. 3, the score of the second traffic indicator is acquired by the following formula:

$$f(D)=0.25\times[\theta_1\times(r_1)^2+\theta_2\times(r_2)^2-(h_1+h_2)\times d_{12}],$$

where $d_{12}$ is a distance between a geometric center of the first vehicle and a geometric center of the second vehicle, $r_1$ and $r_2$ are a dynamic radius of the first vehicle in polar coordinates and a dynamic radius of the second vehicle in polar coordinates, respectively, $\theta_1$ and $\theta_2$ are an angle formed between the geometric center of the first vehicle and overlapping intersections (A and B) of an overlapping zone in the polar coordinates and an angle formed between the geometric center of the second vehicle and overlapping intersections (A and B) of an overlapping zone in the polar coordinates, respectively, and $h_1$ and $h_2$ are relative heights from the two overlapping intersections to $d_{12}$, respectively. In the above embodiment, the safety of the first vehicle passing through the intersection is measured by the area of the danger zone between the first vehicle and the second vehicle.

In an exemplary embodiment, the score of the third traffic indicator is acquired by the following formula:

$$f(\alpha, \theta) = C_1 \times \sqrt{\frac{1}{n}\sum_{i=1}^{n}\left(\frac{d\alpha}{dt}\right)^2} + C_2 \times \sqrt{\frac{1}{n}\sum_{i=1}^{n}\left(\frac{d\theta}{dt}\right)^2},$$

where $C_1$ and $C_2$ are preset weight parameters, the sum of which is 1, for example, $C_1$ is 0.4 and $C_2$ is 0.6; n is the time span taken by the first vehicle to pass through the intersection, $\alpha$ is the acceleration of the first vehicle when executing the respective candidate action instruction, and $\theta$ is the steering wheel angle of the first vehicle when executing the respective candidate action instruction. In the above embodiment, the stationarity of the first vehicle passing through the intersection is measured according to the acceleration of the first vehicle when executing the respective candidate action instruction, a steering wheel angle, and the time span taken by the first vehicle to pass through the intersection.

In an exemplary embodiment, the reward of the first vehicle when executing the respective candidate action instruction is acquired by the following formula:

$$\text{Reward}=k_1\times f(v)-k_2\times f(D)-k_3\times f(\alpha,\theta),$$

where f(v) is a first traffic indicator, f(D) is a second traffic indicator, f($\alpha$, $\theta$) is a third traffic indicator, $k_1$, $k_2$ and $k_3$ are preset weight parameters, the sum of which is 1, for example, $k_1$ is 0.4, $k_2$ is 0.3, and $k_3$ is 0.3, which can be adjusted according to the actual situation of the intersection. In the above embodiment, by comprehensively considering the first traffic indicator, the second traffic indicator, the third traffic indicator, and the corresponding weights, the rewards corresponding to various candidate action instructions are acquired, that is, the comprehensive indicators of safety, efficiency, and comfort are simultaneously considered as a reinforcement learning return function, and the traffic speed and comfort of the first vehicle at the intersection can be effectively improved while ensuring safety.

In an exemplary embodiment, the operation of inputting the sample data to the instruction learning model in the simulated intersection environment to calculate an indicator value and a reward to acquire a candidate action instruction and modifying model parameter values of the instruction learning model according to a matching situation of the calculated candidate action instruction and the optimal actual next action instruction refers to: modifying the values of $C_1$, $C_2$, $k_1$, $k_2$, and/or $k_3$ in the preset instruction learning model by multiple sets of sample data. The modifications are performed for many times until a set of optimal parameter values related to the intersection environment is acquired to acquire a trained instruction learning model.

In an exemplary embodiment, in operation S101, the first vehicle acquires the vehicle signal of the second vehicle located in the set zone in proximity to the intersection through V2V communication. In the exemplary embodiment, the first vehicle acquires the vehicle signal of the second vehicle located in the set zone in proximity to the intersection through a V2V communication device. For example, a vehicle signal of another vehicle within a 100 meter zone in proximity to the intersection is acquired. The use of the V2V device to receive other vehicle information as a state input of the instruction learning model reduces the state input latitude and is advantageous for improving the model processing speed.

V2V is a communication technology that is not limited to a fixed base station, provides direct wireless communication from one end to another end for moving vehicles, and can monitor open "hidden" data such as the speed and position of other vehicles driving on the intersection. That is, through the V2V communication technology, vehicle terminals directly exchange wireless information with each other without forwarding through a base station.

In an exemplary embodiment, in operation S103, the operation that navigation of the first vehicle through the intersection is controlled according to the next action instruction includes that: an acceleration and/or steering wheel angle of the first vehicle when passing through the intersection are controlled according to the next action instruction.

In an exemplary embodiment, the intersection traffic control method further includes that: whether the first vehicle leaves the intersection is judged, and if not, the vehicle signal of the first vehicle and the vehicle signal of the second vehicle are periodically acquired according to a preset frequency (for example, 100 HZ) to determine a next action instruction of the first vehicle, and the navigation of the first vehicle is controlled based on the instruction learning model until the first vehicle passes through the intersection. In the above embodiment, the next action instruction of the first vehicle is periodically determined by setting the frequency until it leaves the intersection, which is beneficial to ensure the safety and timeliness of the first vehicle in the whole passage process of intersection.

Figure 4:
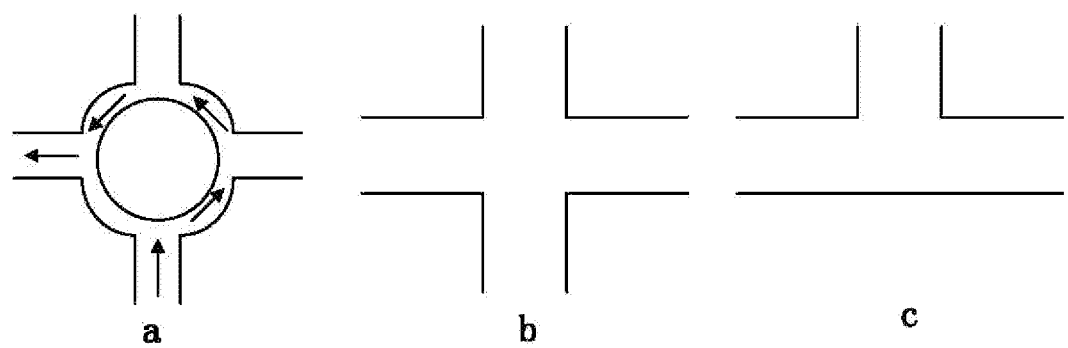
FIG. 4 is a schematic structure diagram of an intersection according to an embodiment.

FIG. 4 is a schematic structure diagram of an intersection according to an embodiment. In an exemplary embodiment, as shown in FIG. 4, the intersection includes any one of a roundabout intersection a, a crossroad b without a traffic light, and a T-shaped intersection c without a traffic light.

Figure 5:
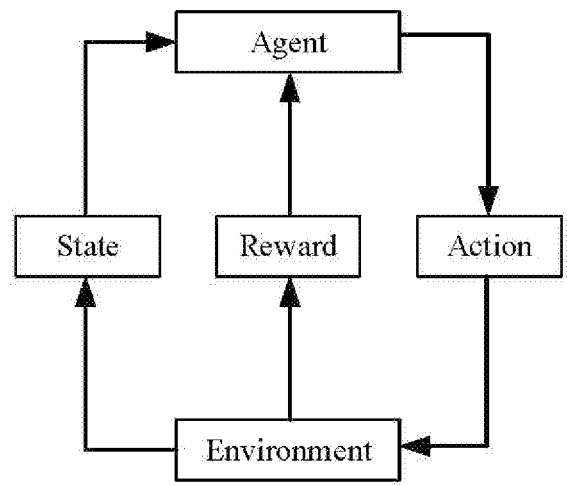
FIG. 5 is a schematic structure diagram of an instruction learning model according to an embodiment.

FIG. 5 is a schematic structure diagram of an instruction learning model according to an embodiment. In a specific embodiment, as shown in FIG. 5, the instruction learning model includes an agent, an environment, and a task interacted between an agent and an environment. The interacted task includes a series of actions, a state and a reward. At each moment, the agent determines a next action according to an observation result of the current environment (i.e., a vehicle signal of a first vehicle at an intersection and a vehicle signal of a second vehicle located in a set zone in proximity to the intersection), the observation result of each environment is the state of the agent, and the next action is determined according to the state of the agent. By learning and processing the task interacted between the agent and the environment for many times, an optimal process from the state to the next action is determined so as to form a set of optimal agent execution strategies.

The agent represents a capable object such as a robot and an unmanned vehicle. The reward indicates whether the change of the environment is good after the agent performs the task interacted between the action and the environment.

Further, the state and the action have a mapping relationship, that is, each state corresponds to one action, and the process from the state to the action is called a strategy. The action is determined by the state in the current environment, as the next action of the agent.

The state includes the following: acquiring position information (GPS latitude and longitude coordinates) of a current vehicle, vehicle speed information, acceleration information and steering wheel angle information through a CAN, and acquiring position information (GPS latitude and longitude coordinates) of other vehicles located within a range of 100 m around an intersection, vehicle speed information, acceleration information and steering wheel angle information through a V2V device.

The action instruction Action adopts a stepping control mode and an update frequency of 100 Hz. The Action is divided into two categories. One is speed latitude control, subdivided into three categories: vehicle speed maintaining, recorded as 0, vehicle acceleration for 1 km/h, recorded as 1, and vehicle deceleration for 1 km/h (including parking), recorded as 2. The other is direction latitude control, subdivided into three categories: direction maintaining, recorded as 0, leftward direction adjustment for one degree, recorded as 1, and rightward direction adjustment for one degree, recorded as 2. There are nine categories of instruction Actions, coded as follows:

| | | Number | | | |
|---|---|---|---|---|---|
| | ACT1 | ACT2 | ACT3 | ACT4 | ACT5 |
| Definition | Leftward acceleration | Leftward constant-speed action | Leftward deceleration | Maintained acceleration | Maintained constant-speed action |
| Code | 11 | 10 | 12 | 01 | 00 |

| | Number | | | |
|---|---|---|---|---|
| | ACT6 | ACT7 | ACT8 | ACT9 |
| Definition | Maintained deceleration | Rightward acceleration | Rightward constant-speed action | Rightward deceleration |
| Code | 02 | 21 | 20 | 22 |

The calculation method of Reward is detailed as follows:

$$Reward = K1*f(v) - K2*f(D) - K3*f(a,\theta).$$

f(v) is a traffic efficiency indicator, having a weight of K1 and set as 0.4 during initiation.

f(D) is a traffic safety indicator, having a weight of K2 and set as 0.3 during initiation.

f(a, θ) is a traffic comfort indicator, having a weight of K3 and set as 0.3 during initiation.

After the agent executes an action, the environment will update the state and acquire the latest reward measured value. The trained agent calculates the reward predicted value after executing each action instruction (such as the above 9 types) based on the updated state and reward measured values. The action instruction with the highest reward predicted value is selected as a next action preferably.

In the above embodiment, a task interacted between the agent and the environment is trained and learned for many times to form a set of optimal agent execution strategies; furthermore, the comprehensive indicators of safety, efficiency, and comfort are simultaneously considered as a reinforcement learning return function, and the traffic speed and comfort of the first vehicle at the intersection can be effectively improved while ensuring safety.

It is to be noted that, for the foregoing method embodiments, for the sake of brevity, they are all described as a series of action combinations, but those skilled in the art should understand that the present disclosure is not limited by the described action sequence, because certain operations may be performed in other sequences or concurrently in accordance with the present disclosure.

Based on the same idea as the intersection traffic control method in the above embodiment, the present disclosure also provides an intersection traffic control system that can be used to execute the above intersection traffic control method. For the convenience of description, in the schematic structure diagram showing the embodiment of a mail delivery system, only the parts related to the embodiment of the present disclosure are shown. Those skilled in the art can understand that the illustrated structure does not constitute a limitation on the system, may include more or fewer parts than shown, or combine some parts, or arrange different parts.

Figure 6:
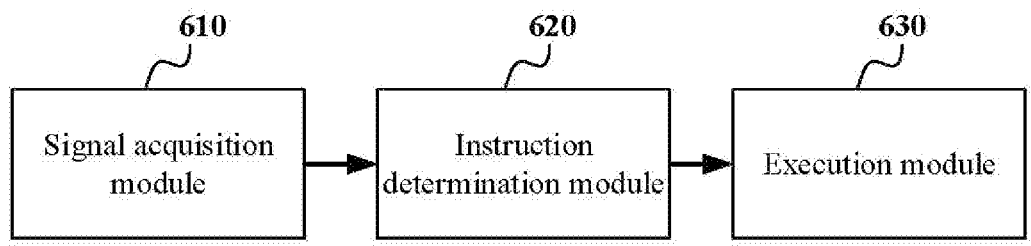
FIG. 6 is a schematic structure diagram of an intersection traffic control apparatus according to an embodiment.

FIG. 6 is a schematic structure diagram of an intersection traffic control apparatus according to an embodiment. As shown in FIG. 6, the intersection traffic control apparatus in the present embodiment includes: a signal acquisition module 610, an instruction determination module 620 and an execution module 630.

The signal acquisition module 610 is configured to acquire a vehicle signal of a first vehicle at an intersection and a vehicle signal of a second vehicle located in a set zone in proximity to the intersection.

The instruction determination module 620 is configured to input the vehicle signal of the first vehicle and the vehicle signal of the second vehicle into an instruction learning model trained in advance based on a reinforcement learning model, acquire an output result of the instruction learning model, and determine a next action instruction of the first vehicle according to the output result.

The execution module 630 is configured to control navigation of the first vehicle through the intersection according to the next action instruction.

The instruction learning model calculates, according to the input vehicle signal of the first vehicle and the input vehicle signal of the second vehicle, a score of a preset traffic indicator of the first vehicle after executing a respective candidate action instruction, acquires, according to the score of the preset traffic indicator, a reward of the first vehicle when executing the respective candidate action instruction, and determines a candidate action instruction corresponding to a maximum reward as the output result.

In an exemplary embodiment, the intersection traffic control apparatus further includes: an instruction learning model acquiring module, configured to: construct a simulated intersection environment similar to an intersection environment; acquire multiple sets of preset sample data, each set of preset sample data including a vehicle signal of a first vehicle and a vehicle signal of a second vehicle in the simulated intersection environment, and further including information of an optimal actual next action instruction enabling the first vehicle to normally pass through the intersection; and input the sample data to the instruction learning model in the simulated intersection environment to calculate an indicator value and a reward to acquire a candidate action instruction, and modify model parameter values of the instruction learning model according to a matching situation of the calculated candidate action instruction and the optimal actual next action instruction until a matching degree between the next action instruction of the first vehicle predicted by the instruction learning model and the optimal actual next action instruction of the first vehicle reaches a set matching threshold.

In an exemplary embodiment, the preset traffic indicator includes one or more of a first traffic indicator acquired based on a speed, a second traffic indicator acquired based on a danger zone, and a third traffic indicator acquired based on an acceleration and a steering angle. The first traffic indicator is acquired by means of the following manner: determining the score of the first traffic indicator according to an average speed of the first vehicle from entering the intersection to reaching a current position, the first traffic indicator being used to represent efficiency of the first vehicle passing through the intersection, namely a traffic efficiency indicator. The second traffic indicator is acquired by means of the following manner: determining the score of the second traffic indicator according to an area of the danger zone between the first vehicle and the second vehicle, the second traffic indicator being used to represent safety of the first vehicle passing through the intersection, namely, a traffic safety indicator, and the danger zone being an overlapping zone of an elliptical zone where the first vehicle is located and an elliptical zone where the second vehicle is located, as shown in FIG. 3. The third traffic indicator is acquired by means of the following manner: determining the score of the third traffic indicator according to an acceleration of the first vehicle, a steering wheel angle, and the time span taken by the first vehicle to pass through the intersection, the third traffic indicator being used to represent stationarity of the first vehicle passing through the intersection, namely, a traffic comfort indicator.

In an exemplary embodiment, the reward is acquired by means of the following manner: performing weighted summation on the score of the first traffic indicator, the score of the second traffic indicator and the score of the third traffic indicator to acquire the reward of the first vehicle when executing the respective candidate action instruction.

In an exemplary embodiment, the signal acquisition module 610 may be configured to acquire, by the first vehicle, the vehicle signal of the second vehicle located in the set zone in proximity to the intersection through V2V communication.

In an exemplary embodiment, the execution module 630 may be configured to control an acceleration and/or steering wheel angle of the first vehicle when passing through the intersection according to the next action instruction.

In an exemplary embodiment, the intersection traffic control apparatus further includes: a judgment module, configured to judge whether the first vehicle leaves the intersection, and if not, the vehicle signal of the first vehicle and the vehicle signal of the second vehicle are periodically acquired according to a preset frequency and control navigation of the first vehicle based on the instruction learning model until the first vehicle passes through the intersection.

According to each of the above embodiments, the signal acquisition module acquires a vehicle signal of a first vehicle at an intersection and a vehicle signal of a second vehicle located in a set zone in proximity to the intersection; the instruction determination module inputs the vehicle signal of the first vehicle and the vehicle signal of the second vehicle into an instruction learning model trained in advance based on a reinforcement learning model, acquires an output result of the instruction learning model, and determines a next action instruction according to the output result; and the execution module controls the navigation of the first vehicle through the intersection according to the next action instruction. When passing through the intersection, an optimal next action instruction of the first vehicle that can ensure safety is acquired in real time through a pre-trained instruction learning model. Under the premise of ensuring the traffic safety of the intersection, the defect of low intersection traffic efficiency caused by passage of the intersection at a low speed is overcome and the traffic efficiency of the intersection is improved.

Figure 7:
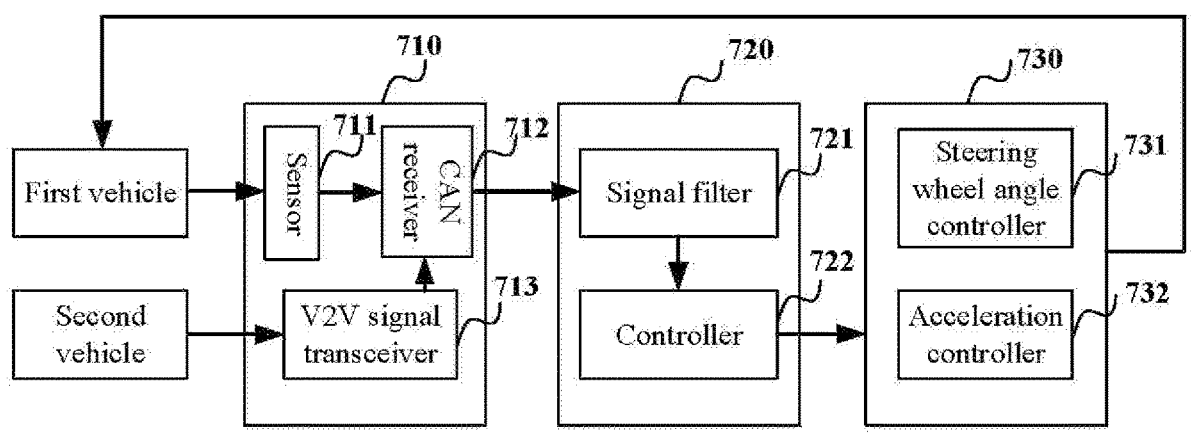
FIG. 7 is a schematic structure diagram of an intersection traffic control system according to an embodiment.

FIG. 7 is a schematic structure diagram of an intersection traffic control system according to an embodiment. In an embodiment, as shown in FIG. 7, the intersection traffic control system includes: a sensor module 710, a processor module 720 and an executor module 730. The sensor module 710 includes a sensor 711, a CAN receiver 712 and a V2V signal transceiver 713, the sensor 711 is configured to acquire vehicle information of a first vehicle at an intersection, the V2V signal transceiver 713 is configured to acquire a vehicle signal of a second vehicle located in a set zone in proximity to the intersection, and the CAN receiver 712 is configured to collect the vehicle signal of the first vehicle acquired by the sensor and the vehicle signal of the second vehicle acquired by the V2V signal transceiver 713, and send the vehicle signal of the first vehicle and the vehicle signal of the second vehicle to the processor module 720.

The processor module 720 is configured to input the vehicle signal of the first vehicle and the vehicle signal of the second vehicle into an instruction learning model trained in advance based on a reinforcement learning principle, acquire an output result of the instruction learning model, determine a next action instruction of the first vehicle according to the output result, and output the next action instruction to the executor module 730.

The executor module 730 is configured to control navigation of the first vehicle through the intersection according to the next action instruction.

In an embodiment, the processor module 720 is further configured to filter, before inputting the vehicle signal of the first vehicle and the vehicle signal of the second vehicle into an instruction learning model trained in advance based on a reinforcement learning principle, the vehicle signal of the first vehicle and the vehicle signal of the second vehicle. In the exemplary embodiment, the processor module 720 includes a signal filter 721 and a controller 722. The signal filter 721 is connected to the CAN receiver 711. The signal filter 721 is connected to the controller 722. The controller 722 is connected to the executor module 730. The signal filter 721 is configured to filter the vehicle signal of the first vehicle and the vehicle signal of the second vehicle, and input the filtered vehicle signal of the first vehicle and the filtered vehicle signal of the second vehicle into an instruction learning model trained in advance based on a reinforcement learning principle in the controller 722. The controller 722 is configured to acquire an output result of the instruction learning model, determine a next action instruction according to the output result, and output the next action instruction to the executor module 730.

Further, in an embodiment, the executor module 730 includes a steering wheel angle controller 731 and an acceleration controller 732, the steering wheel angle controller 731 is configured to control a steering wheel angle of the first vehicle, and the acceleration controller 732 is configured to control an acceleration of the first vehicle.

According to the intersection traffic control system of the above embodiment, the sensor module acquires the vehicle signal of the first vehicle and the vehicle signal of the second vehicle in a set zone in proximity to the intersection, and sends the vehicle signals of the first vehicle and the second vehicle to the processor module, the processor module filters the vehicle signals of the first vehicle and the second vehicle, inputs them into the instruction learning model, uses an output result of the instruction learning model as a next action instruction of the first vehicle, and sends the next action instruction to the executor module, and the executor module controls an acceleration and/or steering wheel angle of the first vehicle passing through the intersection through the next action instruction. When passing through the intersection, a next action instruction of the first vehicle that can ensure safety is acquired in real time through a pre-trained instruction learning model. Under the premise of ensuring the traffic safety of the intersection, the defect of low intersection traffic efficiency caused by passage of the intersection at a low speed is overcome and the traffic efficiency of the intersection is improved.

It is to be noted that since the information interaction, the execution process and the like between the modules/units are based on the same concept as the foregoing method embodiments of the present disclosure in the implementation manner of the intersection traffic control system of the above example, the technical effects are the same as those of the foregoing method embodiments of the present disclosure. Details may refer to the description in the method embodiments of the present disclosure, and the details are not described herein again.

In addition, in the implementation manner of the intersection traffic control system of the above example, the logical division of each program module is merely an example. During actual application, according to requirements, for example, in view of the configuration requirements of corresponding hardware or the convenience of implementation of software, the above function assignment is performed by different program modules, that is, the internal structure of the intersection traffic control system is divided into different program modules to complete all or part of the functions described above.

Those skilled in the art can understand that all or part of the processes in the above method embodiments may be implemented by a computer program to instruct related hardware, and the program may be stored in a computer readable storage medium as an independent product for sales or use. The program, when executed, may perform all or part of the operations in the embodiments of the methods described above. The storage medium may be a magnetic disk, an optical disk, a Read-Only Memory (ROM), or a Random Access Memory (RAM).

Hereby, in an embodiment, a storage medium is also provided. The storage medium has a computer program stored thereon, wherein the program is executed by a processor to implement any one intersection traffic control method in each of the above embodiments.

In addition, the storage medium may also be disposed in a computer device, the computer device further includes a processor, and when the processor executes the program in the storage medium, all or part of the operations in the embodiments of the above methods can be implemented.

Hereby, in an embodiment, a computer device is provided, which includes a memory, a processor and a computer program stored on the memory and runnable on the processor, wherein the processor executes the program to implement any one intersection traffic control method in each of the above embodiments.

In the above embodiment, descriptions of each embodiment are emphasized respectively, and parts which are not elaborated in detail in a certain embodiment may refer to relevant descriptions of other embodiments. It will be appreciated that the used terms "first", "second" and the like are used herein to distinguish objects, but these objects are not limited by these terms.

The above embodiments are merely illustrative of several implementation manners of the present disclosure and are not to be construed as limiting the patent scope of the present disclosure. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. An intersection traffic control method, comprising:
acquiring a vehicle signal of a first vehicle at an intersection and a vehicle signal of a second vehicle located in a set zone in proximity to the intersection;
inputting the vehicle signal of the first vehicle and the vehicle signal of the second vehicle into an instruction learning model trained in advance based on a reinforcement learning principle, acquiring an output result of the instruction learning model, and determining a next action instruction of the first vehicle according to the output result; and
controlling navigation of the first vehicle through the intersection according to the next action instruction,
wherein the instruction learning model calculates, according to the input vehicle signal of the first vehicle and the input vehicle signal of the second vehicle, a score of a preset traffic indicator of the first vehicle after executing a respective candidate action instruction, acquires, according to the score of the preset traffic indicator, a reward of the first vehicle when executing the respective candidate action instruction, and determines a candidate action instruction corresponding to a maximum reward as the output result;
the preset traffic indicator comprises a first traffic indicator acquired based on a speed, a second traffic indicator acquired based on a danger zone, and a third traffic indicator acquired based on an acceleration and a steering angle;
a score of the first traffic indicator is acquired by means of the following manner: determining the score of the first traffic indicator under the respective candidate action instruction according to an average speed of the first vehicle from entering the intersection to executing the respective candidate action instruction, the first traffic indicator being used to represent efficiency of the first vehicle passing through the intersection;
a score of the second traffic indicator is calculated by means of the following manner: determining the score of the second traffic indicator under the respective candidate action instruction according to an area of the danger zone between the first vehicle, when executing the respective candidate action instruction, and the second vehicle, the second traffic indicator being used to represent safety of the first vehicle passing through the intersection, and the danger zone being an overlapping zone of an elliptical zone where the first vehicle is located and an elliptical zone where the second vehicle is located;
a score of the third traffic indicator is calculated by means of the following manner: determining the score of the third traffic indicator under the respective candidate action instruction according to an acceleration and a steering wheel angle of the first vehicle and a time span taken by the first vehicle to pass through the intersection when the first vehicle executes the respective candidate action instruction, the third traffic indicator being used to represent stationarity of the first vehicle passing through the intersection;
the score of the second traffic indicator is acquired by the following formula:

$$f(D)=0.25\times[\theta_1\times(r_1)^2+\theta_2\times(r_2)^2-(h_1+h_2)\times d_{12}],$$

where $d_{12}$ is a distance between a geometric center of the first vehicle and a geometric center of the second vehicle, $r_1$ and $r_2$ are a dynamic radius of the first vehicle in polar coordinates and a dynamic radius of the second vehicle in polar coordinates, respectively, $\theta_1$ and $\theta_2$ are an angle formed between the geometric center of the first vehicle and overlapping intersections of the overlapping zone in the polar coordinates and an angle formed between the geometric center of the second vehicle and the overlapping intersections of the overlapping zone in the polar coordinates, respectively, and $h_1$ and $h_2$ are vertical distances from the overlapping intersections of the overlapping zone to $d_{12}$, respectively;

and/or, the score of the third traffic indicator is acquired by the following formula:

$$f(\alpha, \theta) = C_1 \times \sqrt{\frac{1}{n}\sum_{i=1}^{n}\left(\frac{d\alpha}{dt}\right)^2} + C_2 \times \sqrt{\frac{1}{n}\sum_{i=1}^{n}\left(\frac{d\theta}{dt}\right)^2},$$

where $C_1$ and $C_2$ are preset weight factors, n is the time span taken by the first vehicle to pass through the intersection, $\alpha$ is the acceleration of the first vehicle when executing the respective candidate action instruction, and $\theta$ is the steering wheel angle of the first vehicle when executing the respective candidate action instruction.

2. The intersection traffic control method as claimed in claim 1, wherein the reward is calculated by means of the following manner: performing weighted summation on the score of the first traffic indicator, the score of the second traffic indicator and the score of the third traffic indicator to acquire the reward of the first vehicle when executing the respective candidate action instruction, wherein the vehicle signal comprises one or more of position information, speed information, acceleration information and steering wheel angle information of a vehicle.

3. The intersection traffic control method as claimed in claim 2, wherein the reward of the first vehicle when executing the respective candidate action instruction is acquired by the following formula:

Reward=$k_1 \times f(v) - k_2 \times f(D) - k_3 \times f(\alpha, \theta)$, where Reward represents the reward, $f(v)$ is the first traffic indicator, $f(D)$ is the second traffic indicator, $f(\alpha, \theta)$ is the third traffic indicator, and $k_1$, $k_2$ and $k_3$ are preset weight factors.

4. The intersection traffic control method as claimed in claim 1, further comprising:

judging whether the first vehicle leaves the intersection, and if not, periodically acquiring the vehicle signal of the first vehicle and the vehicle signal of the second vehicle according to a preset frequency and controlling the navigation of the first vehicle based on the instruction learning model until the first vehicle passes through the intersection.

5. The intersection traffic control method as claimed in claim 4, wherein the intersection comprises any one of a roundabout intersection, a crossroad without a traffic light, and a T-shaped intersection without a traffic light;

and/or, the first vehicle acquires the vehicle signal of the second vehicle located in the set zone in proximity to the intersection through Vehicle-to-Vehicle (V2V) communication.

6. The intersection traffic control method as claimed in claim 5, wherein the instruction learning model is acquired by the following manner:

constructing a simulated intersection environment according to an actual intersection environment;

acquiring a plurality of sets of preset sample data, each set of preset sample data comprising a vehicle signal of a first vehicle and a vehicle signal of a second vehicle in the simulated intersection environment, and further comprising information of an optimal actual next action instruction enabling the first vehicle to normally pass through the intersection; and inputting the sample data to the instruction learning model in the simulated intersection environment to calculate an indicator value and a reward to acquire a candidate action instruction, and modifying model parameter values of the instruction learning model according to a matching situation of the calculated candidate action instruction and the optimal actual next action instruction until a matching degree between the next action instruction of the first vehicle predicted by the instruction learning model and the optimal actual next action instruction of the first vehicle reaches a set matching threshold.

7. An intersection traffic control apparatus, comprising:

a signal acquisition module, configured to acquire a vehicle signal of a first vehicle at an intersection and a vehicle signal of a second vehicle located in a set zone in proximity to the intersection;

an instruction determination module, configured to input the vehicle signal of the first vehicle and the vehicle signal of the second vehicle into an instruction learning model trained in advance based on a reinforcement learning principle, acquire an output result of the instruction learning model, and determine a next action instruction of the first vehicle according to the output result; and an execution module, configured to control navigation of the first vehicle through the intersection according to the next action instruction, wherein the instruction learning model calculates, according to the input vehicle signal of the first vehicle and the input vehicle signal of the second vehicle, a score of a preset traffic indicator of the first vehicle after executing a respective candidate action instruction, acquires, according to the score of the preset traffic indicator, a reward of the first vehicle when executing the respective candidate action instruction, and determines a candidate action instruction corresponding to a maximum reward as the output result;

the preset traffic indicator comprises a first traffic indicator acquired based on a speed, a second traffic indicator acquired based on a danger zone, and a third traffic indicator acquired based on an acceleration and a steering angle;

a score of the first traffic indicator is acquired by means of the following manner: determining the score of the first traffic indicator under the respective candidate action instruction according to an average speed of the first vehicle from entering the intersection to executing the respective candidate action instruction, the first traffic indicator being used to represent efficiency of the first vehicle passing through the intersection;

a score of the second traffic indicator is calculated by means of the following manner: determining the score of the second traffic indicator under the respective candidate action instruction according to an area of the danger zone between the first vehicle, when executing the respective candidate action instruction, and the second vehicle, the second traffic indicator being used to represent safety of the first vehicle passing through the intersection, and the danger zone being an overlapping zone of an elliptical zone where the first vehicle is located and an elliptical zone where the second vehicle is located;

a score of the third traffic indicator is calculated by means of the following manner: determining the score of the third traffic indicator under the respective candidate action instruction according to an acceleration and a steering wheel angle of the first vehicle and a time span taken by the first vehicle to pass through the intersection when the first vehicle executes the respective candidate action instruction, the third traffic indicator being used to represent stationarity of the first vehicle passing through the intersection;

the score of the second traffic indicator is acquired by the following formula:

$$f(D)=0.25\times[\theta_1\times(r_1)^2+\theta_2\times(r_2)^2-(h_1+h_2)\times d_{12}],$$

where $d_{12}$ is a distance between a geometric center of the first vehicle and a geometric center of the second vehicle, $r_1$ and $r_2$ are a dynamic radius of the first vehicle in polar coordinates and a dynamic radius of the second vehicle in polar coordinates, respectively, $\theta_1$ and $\theta_2$ are an angle formed between the geometric center of the first vehicle and overlapping intersections of the overlapping zone in the polar coordinates and an angle formed between the geometric center of the second vehicle and the overlapping intersections of the overlapping zone in the polar coordinates, respectively, and $h_1$ and $h_2$ are vertical distances from the overlapping intersections of the overlapping zone to $d_{12}$, respectively;

and/or, the score of the third traffic indicator is acquired by the following formula:

$$f(\alpha,\theta)=C_1\times\sqrt{\frac{1}{n}\sum_{i=1}^{n}\left(\frac{d\alpha}{dt}\right)^2}+C_2\times\sqrt{\frac{1}{n}\sum_{i=1}^{n}\left(\frac{d\theta}{dt}\right)^2},$$

where $C_1$ and $C_2$ are preset weight factors, n is the time span taken by the first vehicle to pass through the intersection, $\alpha$ is the acceleration of the first vehicle when executing the respective candidate action instruction, and $\theta$ is the steering wheel angle of the first vehicle when executing the respective candidate action instruction.

8. An intersection traffic control system, comprising: a sensor module, a processor module and an executor module, wherein the sensor module comprises a sensor, a Controller Area Network (CAN) receiver and a Vehicle-to-Vehicle Communication (V2V) signal transceiver, the sensor is configured to acquire vehicle information of a first vehicle at an intersection, the V2V signal transceiver is configured to acquire a vehicle signal of a second vehicle located in a set zone in proximity to the intersection, and the CAN receiver is configured to collect the vehicle signal of the first vehicle acquired by the sensor and the vehicle signal of the second vehicle acquired by the V2V signal transceiver, and send the vehicle signal of the first vehicle and the vehicle signal of the second vehicle to the processor module;

the processor module is configured to input the vehicle signal of the first vehicle and the vehicle signal of the second vehicle into an instruction learning model trained in advance based on a reinforcement learning principle, acquire an output result of the instruction learning model, determine a next action instruction according to the output result, and output the next action instruction to the executor module; and the executor module is configured to control navigation of the first vehicle through the intersection according to the next action instruction, wherein the instruction learning model calculates, according to the input vehicle signal of the first vehicle and the input vehicle signal of the second vehicle, a score of a preset traffic indicator of the first vehicle after executing a respective candidate action instruction, acquires, according to the score of the preset traffic indicator, a reward of the first vehicle when executing the respective candidate action instruction, and determines a candidate action instruction corresponding to a maximum reward as the output result;

the preset traffic indicator comprises a first traffic indicator acquired based on a speed, a second traffic indicator acquired based on a danger zone, and a third traffic indicator acquired based on an acceleration and a steering angle;

a score of the first traffic indicator is acquired by means of the following manner: determining the score of the first traffic indicator under the respective candidate action instruction according to an average speed of the first vehicle from entering the intersection to executing the respective candidate action instruction, the first traffic indicator being used to represent efficiency of the first vehicle passing through the intersection;

a score of the second traffic indicator is calculated by means of the following manner: determining the score of the second traffic indicator under the respective candidate action instruction according to an area of the danger zone between the first vehicle, when executing the respective candidate action instruction, and the second vehicle, the second traffic indicator being used to represent safety of the first vehicle passing through the intersection, and the danger zone being an overlapping zone of an elliptical zone where the first vehicle is located and an elliptical zone where the second vehicle is located;

a score of the third traffic indicator is calculated by means of the following manner: determining the score of the third traffic indicator under the respective candidate action instruction according to an acceleration and a steering wheel angle of the first vehicle and a time span taken by the first vehicle to pass through the intersection when the first vehicle executes the respective candidate action instruction, the third traffic indicator being used to represent stationarity of the first vehicle passing through the intersection;

the score of the second traffic indicator is acquired by the following formula:

$$f(D)=0.25\times[\theta_1\times(r_1)^2+\theta_2\times(r_2)^2-(h_1+h_2)\times d_{12}],$$

where $d_{12}$ is a distance between a geometric center of the first vehicle and a geometric center of the second vehicle, $r_1$ and $r_2$ are a dynamic radius of the first vehicle in polar coordinates and a dynamic radius of the second vehicle in polar coordinates, respectively, $\theta_1$ and $\theta_2$ are an angle formed between the geometric center of the first vehicle and overlapping intersections of the overlapping zone in the polar coordinates and an angle formed between the geometric center of the second vehicle and the overlapping intersections of the overlapping zone in the polar coordinates, respectively, and $h_1$ and $h_2$ are vertical distances from the overlapping intersections of the overlapping zone to $d_{12}$, respectively;

and/or, the score of the third traffic indicator is acquired by the following formula:

$$f(\alpha, \theta) = C_1 \times \sqrt{\frac{1}{n}\sum_{i=1}^{n}\left(\frac{d\alpha}{dt}\right)^2} + C_2 \times \sqrt{\frac{1}{n}\sum_{i=1}^{n}\left(\frac{d\theta}{dt}\right)^2},$$

where $C_1$ and $C_2$ are preset weight factors, n is the time span taken by the first vehicle to pass through the intersection, $\alpha$ is the acceleration of the first vehicle when executing the respective candidate action instruction, and $\theta$ is the steering wheel angle of the first vehicle when executing the respective candidate action instruction.

9. A computer-readable storage medium on which a computer program is stored, wherein the program is executed by a processor to implement operations in the intersection traffic control method as claimed in claim 1.

10. A computer device, comprising a memory, a processor and a computer program that is stored on the memory and runnable on the processor, wherein the program is executed by the processor to implement operations in the intersection traffic control method as claimed in claim 1.

11. The intersection traffic control method as claimed in claim 2, further comprising:

judging whether the first vehicle leaves the intersection, and if not, periodically acquiring the vehicle signal of the first vehicle and the vehicle signal of the second vehicle according to a preset frequency and controlling the navigation of the first vehicle based on the instruction learning model until the first vehicle passes through the intersection.

12. The intersection traffic control method as claimed in claim 11, wherein the intersection comprises any one of a roundabout intersection, a crossroad without a traffic light, and a T-shaped intersection without a traffic light;

and/or, the first vehicle acquires the vehicle signal of the second vehicle located in the set zone in proximity to the intersection through Vehicle-to-Vehicle (V2V) communication.

13. The intersection traffic control method as claimed in claim 12, wherein the instruction learning model is acquired by the following manner:

constructing a simulated intersection environment according to an actual intersection environment;

acquiring a plurality of sets of preset sample data, each set of preset sample data comprising a vehicle signal of a first vehicle and a vehicle signal of a second vehicle in the simulated intersection environment, and further comprising information of an optimal actual next action instruction enabling the first vehicle to normally pass through the intersection; and inputting the sample data to the instruction learning model in the simulated intersection environment to calculate an indicator value and a reward to acquire a candidate action instruction, and modifying model parameter values of the instruction learning model according to a matching situation of the calculated candidate action instruction and the optimal actual next action instruction until a matching degree between the next action instruction of the first vehicle predicted by the instruction learning model and the optimal actual next action instruction of the first vehicle reaches a set matching threshold.

14. The intersection traffic control method as claimed in claim 3, further comprising:

judging whether the first vehicle leaves the intersection, and if not, periodically acquiring the vehicle signal of the first vehicle and the vehicle signal of the second vehicle according to a preset frequency and controlling the navigation of the first vehicle based on the instruction learning model until the first vehicle passes through the intersection.

15. The intersection traffic control method as claimed in claim 14, wherein the intersection comprises any one of a roundabout intersection, a crossroad without a traffic light, and a T-shaped intersection without a traffic light;

and/or, the first vehicle acquires the vehicle signal of the second vehicle located in the set zone in proximity to the intersection through Vehicle-to-Vehicle (V2V) communication.

16. The intersection traffic control method as claimed in claim 15, wherein the instruction learning model is acquired by the following manner:

constructing a simulated intersection environment according to an actual intersection environment;

acquiring a plurality of sets of preset sample data, each set of preset sample data comprising a vehicle signal of a first vehicle and a vehicle signal of a second vehicle in the simulated intersection environment, and further comprising information of an optimal actual next action instruction enabling the first vehicle to normally pass through the intersection; and inputting the sample data to the instruction learning model in the simulated intersection environment to calculate an indicator value and a reward to acquire a candidate action instruction, and modifying model parameter values of the instruction learning model according to a matching situation of the calculated candidate action instruction and the optimal actual next action instruction until a matching degree between the next action instruction of the first vehicle predicted by the instruction learning model and the optimal actual next action instruction of the first vehicle reaches a set matching threshold.

17. The intersection traffic control apparatus as claimed in claim 7, wherein the apparatus is further configured to:

judge whether the first vehicle leaves the intersection, and if not, periodically acquire the vehicle signal of the first vehicle and the vehicle signal of the second vehicle according to a preset frequency and controlling the navigation of the first vehicle based on the instruction learning model until the first vehicle passes through the intersection.

18. The intersection traffic control apparatus as claimed in claim 17, wherein the intersection comprises any one of a roundabout intersection, a crossroad without a traffic light, and a T-shaped intersection without a traffic light;

and/or,
the first vehicle acquires the vehicle signal of the second vehicle located in the set zone in proximity to the intersection through Vehicle-to-Vehicle (V2V) communication.

19. The intersection traffic control system as claimed in claim 8, wherein the system is further configured to:
judge whether the first vehicle leaves the intersection, and if not, periodically acquire the vehicle signal of the first vehicle and the vehicle signal of the second vehicle according to a preset frequency and controlling the navigation of the first vehicle based on the instruction learning model until the first vehicle passes through the intersection.

20. The intersection traffic control system as claimed in claim 19, wherein
the intersection comprises any one of a roundabout intersection, a crossroad without a traffic light, and a T-shaped intersection without a traffic light;
and/or,
the first vehicle acquires the vehicle signal of the second vehicle located in the set zone in proximity to the intersection through Vehicle-to-Vehicle (V2V) communication.

* * * * *